(12) United States Patent
Ergen et al.

(10) Patent No.: US 7,814,510 B1
(45) Date of Patent: Oct. 12, 2010

(54) METHODS AND APPARATUS FOR SIMPLIFIED REMOTE CONTROL OPERATION OF COMPONENTS

(76) Inventors: Charles W Ergen, 90 Inverness Cir. East, Englewood, CO (US) 80112; Michael T. Dugan, 7539 E. Inspiration Dr., Parker, CO (US) 80138; David A Kummer, 8947 S. Green Meadows La., Highlands Ranch, CO (US) 80126; William M Beals, 5962 S. Ironton Ct., Englewood, CO (US) 80111; Daniel L Rudolph, 2175 Kahala Cir., Castle Rock, CO (US) 80104; Mark H. Gomez, 11830 Bell Cross Cir., Parker, CO (US) 80138; Henry Gregg Martch, 21857 Silver Meadow La., Parker, CO (US) 80138; Adam C Morzos, 5343 Territorial St., Parker, CO (US) 80134

(*) Notice: Subject to any disclaimer, the term of this patent is extended or adjusted under 35 U.S.C. 154(b) by 1266 days.

(21) Appl. No.: 11/118,462

(22) Filed: Apr. 29, 2005

Related U.S. Application Data (60) Provisional application No. 60/567,027, filed on Apr. 29, 2004.

(51) Int. Cl.
  *G06N 3/00* (2006.01)
  *G06F 13/00* (2006.01)
  *H04N 5/445* (2006.01)
  *H04N 7/16* (2006.01)
  *H04N 5/44* (2006.01)

(52) U.S. Cl. .................... 725/38; 725/139; 348/734

(58) Field of Classification Search .................... None
  See application file for complete search history.

(56) References Cited

U.S. PATENT DOCUMENTS

| | | | | |
|---|---|---|---|---|
| 4,348,696 | A * | 9/1982 | Beier | 725/29 |
| 5,767,919 | A * | 6/1998 | Lee et al. | 725/37 |
| 6,256,019 | B1 * | 7/2001 | Allport | 345/169 |
| 6,879,351 | B1 * | 4/2005 | Brown | 348/734 |
| 2004/0148632 | A1 * | 7/2004 | Park et al. | 725/81 |

* cited by examiner

*Primary Examiner*—Andrew Y Koenig
*Assistant Examiner*—Mark D Featherstone
(74) *Attorney, Agent, or Firm*—Setter Roche LLP (57) ABSTRACT

A remote control and method of programming a remote control for controlling components in an entertainment system are disclosed. The remote control may operate in multiple modes including a limited mode that prevents the remote control from sending predetermined commands to one or more components, even when instructed to do so by the user. In addition, the remote control may issue one or more commands to each component in response to a single user input.

24 Claims, 6 Drawing Sheets

| Command Key Name | Satellite Limited Mode Functions | Off Air (TV) Limited Mode Functions |
|---|---|---|
| Satellite Power | Toggles Satellite Power | |
| TV Power | Toggles TV Power | Toggles TV Power |
| Satellite Display | Changes 'setup' to Satellite viewing | |
| Off-Air Display | | |
| 'Dish' | Home / Portal | |
| Menu | Menu | |
| Guide | Guide | |
| Up Arrow | Up Arrow | |
| Left Arrow | Left Arrow / Themes | |
| Select | Select | |
| Right Arrow | Right Arrow / Browse | |
| Down Arrow | Down Arrow | |
| Info | Info | |
| Cancel | Cancel | |
| Volume Down | | Volume Down |
| Volume Up | | Volume Up |
| 1 | 1 | |
| 2 | 2 | |
| 3 | 3 | |
| 4 | 4 | |
| 5 | 5 | |
| 6 | 6 | |
| 7 | 7 | |
| 8 | 8 | |
| 9 | 9 | |
| 0 | 0 | |
| * | Used in Programming | |
| # | Used in Programming | |

| Command Key Name | Satellite Normal Mode Functions | Off Air (TV) Normal Mode Functions |
|---|---|---|
| Satellite Power | Toggles Satellite Power | |
| TV Power | Toggles TV Power | Toggles TV Power |
| Satellite Display | Changes 'setup' to Satellite viewing | |
| Off-Air Display | | Changes 'setup' to TV viewing |
| 'Dish' | Home / Portal | |
| Menu | Menu | |
| Guide | Guide | |
| Up Arrow | Up Arrow | Channel Up |
| Left Arrow | Left Arrow / Themes | |
| Select | Select | Enter |
| Right Arrow | Right Arrow / Browse | |
| Down Arrow | Down Arrow | Channel Down |
| Info | Info | |
| Cancel | Cancel | |
| Volume Down | Volume Down | Volume Down |
| Volume Up | Volume Up | Volume Up |
| 1 | 1 | 1 |
| 2 | 2 | 2 |
| 3 | 3 | 3 |
| 4 | 4 | 4 |
| 5 | 5 | 5 |
| 6 | 6 | 6 |
| 7 | 7 | 7 |
| 8 | 8 | 8 |
| 9 | 9 | 9 |
| 0 | 0 | 0 |
| * | Used in Programming | |
| # | Used in Programming | |

FIG. 4

| Command Key Name | Satellite Limited Mode Functions | Off Air (TV) Limited Mode Functions |
|---|---|---|
| Satellite Power | Toggles Satellite Power | |
| TV Power | Toggles TV Power | Toggles TV Power |
| Satellite Display | Changes 'setup' to Satellite viewing | |
| Off-Air Display | | |
| 'Dish' | Home / Portal | |
| Menu | Menu | |
| Guide | Guide | |
| Up Arrow | Up Arrow | |
| Left Arrow | Left Arrow / Themes | |
| Select | Select | |
| Right Arrow | Right Arrow / Browse | |
| Down Arrow | Down Arrow | |
| Info | Info | |
| Cancel | Cancel | |
| Volume Down | | Volume Down |
| Volume Up | | Volume Up |
| 1 | 1 | |
| 2 | 2 | |
| 3 | 3 | |
| 4 | 4 | |
| 5 | 5 | |
| 6 | 6 | |
| 7 | 7 | |
| 8 | 8 | |
| 9 | 9 | |
| 0 | 0 | |
| * | Used in Programming | |
| # | Used in Programming | |

METHODS AND APPARATUS FOR SIMPLIFIED REMOTE CONTROL OPERATION OF COMPONENTS

RELATED APPLICATIONS

This application claims priority to U.S. Provisional Application Ser. No. 60/567,027, titled EZ REMOTE CONTROL filed Apr. 29, 2004, which application is hereby incorporated herein by reference.

FIELD OF THE INVENTION

The present invention generally relates to an apparatus and method for remotely controlling multiple devices. More particularly, the invention relates to an apparatus and method of remotely controlling multiple devices in an entertainment system.

BACKGROUND OF THE INVENTION

A modern entertainment system typically contains a number of components. Such components as a video cassette recorder (VCR), a digital video disc (DVD) player, cable and satellite set-top-boxes (STBs), and home theater systems have become commonplace in addition to the television (TV). However, with the increase in the number of components, the operation of entertainment systems has become more complex.

Typically, each component will have a number of different 'operational states' relating to what signals are received and transmitted by the component. For example, a TV tuned to a specific channel, say channel 3, can be regarded as being in the operational state of displaying the television programming on channel 3. A VCR typically has several operational states relating to both the delivery (output) to the TV of television programming (e.g., delivery of programming on channel 3, delivery of programming on channel 4 or 'TV/VCR' delivery, that essentially bypasses the VCR altogether) and the receipt (input) of television programming (e.g., VCR tuned to various channels). Other entertainment system components, such as DVD players and STBs, may have a similar multitude of operational states.

A drawback of the proliferation of components with multiple operational states is that it has become a difficult and complicated task to make the entertainment system operate properly. In modern systems it is very easy for a user to inadvertently change the operational state of one of the components so that the entertainment system is inoperable (i.e., will not display television programming until the inadvertent change is rectified). In these situations the user often does not know what the user did or how to return the entertainment system to the original, operable configuration.

Take, for example, a typical VCR and TV combination where the TV and VCR must be set to the same channel, usually 3 or 4 (e.g., the VCR must be set to deliver and the TV must be set to display television programming on the same channel). If the user accidentally or unknowingly changes the channel on the TV, the television programming delivered by the VCR will no longer be displayed by the TV. In addition, if the television programming source (such as an antenna) is routed through the VCR, the TV may not be able to display any television programming at all. In this example, the VCR/TV entertainment system can be easily returned to an operable configuration by changing the TV's channel back to the same channel used by the VCR. However, if the user does not know that the channel on the TV was changed, the user may not understand why the entertainment system is inoperable and be unable to correct the problem. Furthermore, the user's attempts to correct the problem may change other operational states of the components and further compound the inoperability of the VCR/TV entertainment system.

The VCR/TV entertainment system discussed above is an example of an entertainment system with multiple configurations, both operable and inoperable. When the TV is set to display channel 3 and the VCR is set to deliver programming on channel 3, the entertainment system works and is said to be in an operable configuration. If, however, the TV is set to channel 4 and the VCR to deliver on channel 3, television programming delivered by the VCR is not displayed on the TV and the system is said to be in an inoperable configuration (at least with respect to programming delivered by the VCR).

Many entertainment system users do not understand how the various components must be configured for the entertainment system to operate as desired. This makes it difficult for these users to rectify inadvertent configuration changes. In addition, even sophisticated users may unknowingly change the configuration and have difficulty returning the system to an operable configuration.

One drawback of this problem is that inadvertent configuration changes often are interpreted by the unsophisticated user as a hardware failure or some other failure. The programming distributor (i.e., their cable television or direct to home satellite television providers) is typically the only source of technical assistance available since most entertainment system owners do not have an ongoing relationship with the component manufacturers. In these perceived hardware failure situations, a typical user response is to call the programming distributor's technical assistance call center. Calls due to configuration changes can represent a very significant portion of the calls received, and thus a significant cost to the programming distributor supporting the call center. If the number of these calls can be reduced, it would result in cost benefits for the programming distributor. There is therefore a need on the part of the programming distributors to reduce the number and the duration of calls to their technical assistance departments resulting from inadvertent configuration changes.

The increased use of universal remote controls that allow the user to select between components when issuing commands has exacerbated the problem of inadvertently changing configurations. Universal remote controls have become popular as they can replace the plethora of component-specific remote controls. However, the user may become confused as to what component the universal remote control is currently set to control and, subsequently, the user may inadvertently issue a series of commands to the wrong component, for example to the TV while thinking that he is controlling the VCR or some other component.

Universal remote controls may also be difficult to use. In order to issue a command to a specific component, the user must first inform the universal remote control that he wishes to issue a command to that component. Typically, informing the remote control of a new command is done by pressing a button that corresponds to the component. Next, the user typically presses the button of the desired command. Even more steps may be required if the user needs to issue commands to several devices in order to achieve the desired result. For example, in the situation where all the components of the entertainment system are currently turned off, the user may have to separately command each of the components to turn on, as well as command the VCR to play. The resulting large number of instructions required to turn on the entertainment system and then instruct it to display the desired programming is inconvenient and potentially frustrating to the user. In addition, the need for multiple keystrokes greatly increases the chance that the user may inadvertently change the configuration of the entertainment system and require the user to reconfigure the system with yet more keystrokes.

Therefore, entertainment system users have a need for a remote control that limits the user's ability to reconfigure the entertainment system to an inoperable configuration. In addition, television programming providers (such as direct to home satellite television and cable television providers) also have a need to limit the user's ability to reconfigure the entertainment system to an inoperable configuration. There is also a need for a universal remote control that is simpler to use.

DETAILED DESCRIPTION OF THE PREFERRED EMBODIMENTS

In this specification, the present invention will be described using methods and systems related to an entertainment system that includes subscriber satellite television components. This specific description is not meant to limit the invention to that one embodiment. One skilled in the art will recognize that the present invention can apply elsewhere. While the invention has been particularly shown and described with reference to preferred embodiments thereof, it will be understood by those skilled in the art that various other changes in the form and details may be made therein without departing from the spirit and scope of the invention.

As a general matter, the disclosure uses the term "component" to refer to any electronic device that independently, or together with other electronic devices, delivers content to a user or users of an entertainment system. Examples of components include, but are not limited to, devices such as stereos, TVs, VCRs, DVD players, DVR devices, set-top-boxes (STBs), and home theater receivers. The disclosure also uses the term "instruction" to refer to an input given by a user to a device such as a remote control. An instruction may, or may not, result in the issue of a command to a component. For example, several instructions may be necessary to cause a remote control to send one command to a specific component such as pressing a button to identify the component and then pressing the button of the command to be sent to the component. In addition, many instructions may be necessary to initially program a remote control or otherwise change the operational characteristics of the remote control. The disclosure further uses the term "logic" to refer to any combination of hardware, software and firmware adapted to achieve a specific result. Examples of logic include processors, memory, software stored in memory for running the processor and any electronics required to allow the processors to function. The term "operational state" is also used within the disclosure to describe a condition of a component. Components may have multiple operational states. Examples of components with a plurality of operational states are a TV with selectable channels, or a VCR with selectable output channels (i.e. 3 or 4). Furthermore, turning a component on or off (whether this is achieved by 'toggling' the component's power or via separate on and off commands) or changing the volume level is also considered changing its operational state.

As another general matter, the disclosure uses the term "signal." One skilled in the art will recognize that the signal may be any digital or analog signal. Those signals may include, but are not limited to, a bit, a specified set of bits, an A/C signal, or a D/C signal. Uses of the term "signal" in the description may include any of these different interpretations. It will also be understood to one skilled in the art that the term "connected" is not limited to a physical connection but can refer to any means of communicatively or operatively coupling two devices.

As another general matter, the disclosure uses the terms "content management device," "television converter," "receiver," "set-top-box," "television receiving device," "television receiver," "television recording device," "satellite set-top-box," "satellite receiver," "cable set-top-box," "cable receiver," and "television tuner" to refer interchangeably to a converter device or electronic equipment that may include, but is not limited to, the capacity to acquire, process and distribute one or more television signals transmitted by broadcast, cable, telephone or satellite distributors. "Digital video recorder (DVR)" and "personal video recorder (PVR)" refer interchangeably to devices that can digitally record and play back television signals and that may implement trick functions including, but not limited to, fast-forward, rewind and pause. As set forth in this specification and the figures pertaining thereto, DVR and PVR functionality or devices may be combined with a television converter. The signals transmitted by these broadcast, cable, telephone or satellite distributors may include, individually or in any combination, internet, radio, television or telephonic data or information. One skilled in the art will recognize that a content management device may be implemented as an external self-enclosed unit, a plurality of external self-enclosed units or as an internal unit housed within a television. One skilled in the art will recognize that the present invention can apply to analog and digital satellite set-top-boxes.

As yet another general matter, it will be understood by one skilled in the art that the term "television" refers to a television set or video display that may contain an integrated content management device (e.g., an internal cable-ready television tuner housed inside a television) or, alternatively, that is connected to an external content management device (e.g., an external set-top-box connected via cabling to a television). A further example of an external content management device is the EchoStar Dish PVR 721, Part Number 106525, combination satellite set-top-box and DVR.

As a further general matter, it should be understood that satellite television signals may be very different from broadcast television or other types of signals. Satellite signals may include multiplexed, packetized, and modulated digital signals. Once multiplexed, packetized and modulated, one analog satellite transmission may carry digital data representing several television stations or service providers. Some examples of service providers include HBO™, CSPAN™, ABC™, CBS™, or ESPN™. In satellite television, a service provider can also be compared to a "channel." The term "channel," as used in this disclosure, carries a different meaning from its normal connotation. In broadcast television, different analog signals of a television station may be carried on a carrier frequency and its sub-channels. A tuner in a television may then acquire and process these signals. In broadcast television, the term channel has thus become synonymous with the sub-channel or the station on that sub-channel. The normal connotation of the term "channel" is therefore not always appropriate to describe satellite television transmissions where multiple stations may be multiplexed onto a single carrier frequency. Satellite television distributors, however, may organize the satellite data into a group of different "virtual channels." These virtual channels give the impression that the satellite television programs (the service providers) are placed in channels. This impression may assist user operation of the satellite set-top-box since it models an analog television or analog receiving device. The virtual channels may appear in the electronic program guide (EPG) data and the user may choose programming by selecting a virtual channel. For instance, the user can select HBO, which may be on virtual channel 300, or CSPAN, which may be on virtual channel 210. These service providers or virtual channels are not necessarily carried in the same signal being sent from the same satellite. EPG data may come from a service provider (e.g., HBO), content provider (e.g., Disney), a third party (e.g., TV Guide) or from another outside entity. Thus, in satellite television service a channel may not be the same as in broadcast television service. Rather, channels may be more properly termed service providers in satellite television service. The term "channel" will be used in this description to describe the service providers and the virtual channels they may occupy.

The terms "content," "programming" and "television programming," as used in this disclosure, refer to anything delivered to a user, whether as audio, video, audiovisual (A/V), or data. Content can be video, audio, combined A/V, pictorial, textual or purely electronic in nature. Examples of content include, but are not limited to, distinct TV programs, streaming video, streaming audio, interactive audio, interactive video, distinct musical works, distinct pictorial or graphic works, .htm or .html documents when viewed with a browser, and motion pictures or other A/V works.

Finally, this disclosure uses the term "entertainment system configuration" to describe a specific combination of operational states of the components of an entertainment system. For example, in an entertainment system comprising a TV and a VCR, one operable configuration of the entertainment system is the TV set to channel 3 and a VCR set to output signals on channel 3. This is an example of an operable configuration because the TV can receive and display programming delivered by the VCR. An example of an inoperable configuration is the TV tuned to channel 4 and the VCR tuned to output signals on channel 3. Such a configuration is considered inoperable because the TV cannot display programming delivered to it by the VCR. Likewise, an "operational state" is a term used to describe a condition of a component. Components may have multiple operational states.

Figure 1:
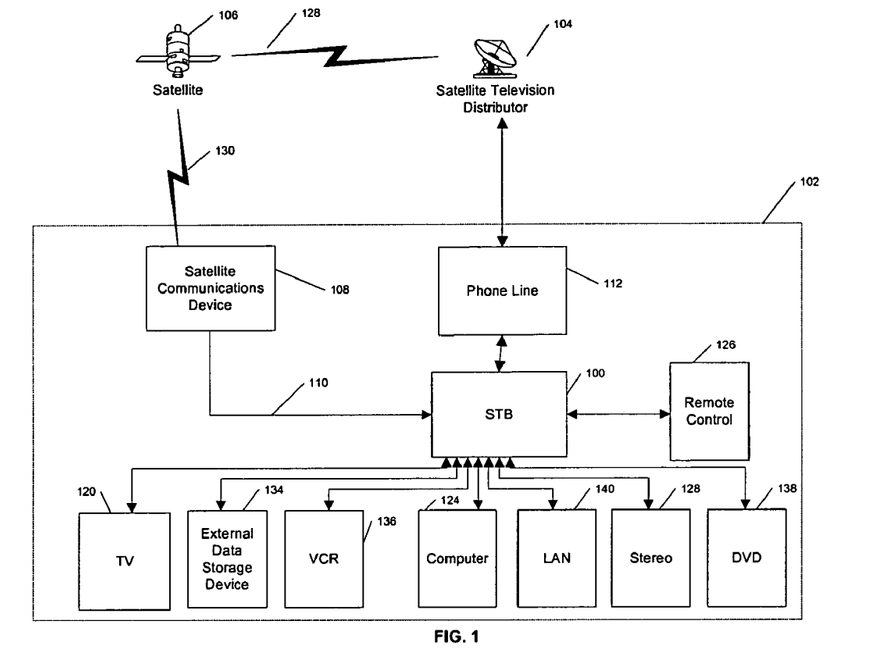
FIG. 1 illustrates an entertainment system in accordance with an embodiment of the present invention.

Turning now to the Drawings, wherein like numbers denote like parts throughout the several views, FIG. 1 presents an embodiment of an entertainment system 102 that includes a television converter device 100 in the form of a satellite set-top-box. Generally, the satellite set-top-box 100 may receive one or more television signals from a cable television distributor, from a broadcast television distributor or from a satellite television distributor 104. As a preferred embodiment, entertainment system 102 receives signals from satellite television distributor 104. One skilled in the art will recognize that set-top-box 100 may also receive video-digital subscriber line (DSL), DSL, Internet, wireless and other signals from content or video distributors. The satellite set-top-box 100 may process television signals and may send the processed signals to peripheral electronic devices, such as a television 120 and remote control 126. The satellite set-top-box 100 also may accept commands from a remote control 126 or other peripheral electronic devices. More detail about the functionality of the satellite set-top-box 100 is provided below. One skilled in the art will recognize that many embodiments of the entertainment system 102 are possible and within the scope of this invention. Other such embodiments may include, but are not limited to, various combinations or permutations of devices and connections for the delivery, storage, and display of communications, content and other data.

To further describe the entertainment system, embodiments relating to receiving satellite television signals will be explained in more detail. A satellite television distributor 104 may transmit one or more satellite television signals 128 to one or more satellites 106. Satellite television distributors may utilize several satellites 106 to relay the satellite television signals to a subscriber. Each satellite 106 may have several transponders. Transponders transmit the signal 130 from the satellite to the subscriber. For example, these signals 130 may be transmitted at a frequency of 2150 Mhz.

A transponder may also polarize the transmitted signal 130 in several ways. One form of polarization in satellite transmissions is circular polarization. For example, transponders of satellite 106 may transmit two signals (together as signal 130) on the same transponder, one signal that is right-hand polarized and another signal that is left-hand polarized. In other words, two signals may be simultaneously transmitted with opposite polarizations. The opposite polarizations may prevent interference. One skilled in the art will recognize that other ways of polarizing signals are possible.

The polarized signals can be received at satellite communication device 108. The satellite communication device 108 may include one or more of the components that follow. One component of satellite communication device 108 may be a satellite dish. A satellite dish can focus the signal on one or more low-noise block filters (LNBF), also referred to as low-noise block down converters (LNBDC). The LNBFs may de-polarize and initially process the signal. This initial processing may include filtering noise from the signal and down-converting the signal. Down-conversion is sometimes required to transmit the signal 110 through certain cables, such as coaxial cables. The signal 110 arrives at the television converter device 100 via cabling. One skilled in the art will recognize that other methods and other systems of delivering the satellite signal 110 to the satellite set-top-box 100 may be possible.

It will be understood to one skilled in the art that while FIG. 1 shows the components connected serially, the disclosure also contemplates entertainment systems 102 where the components are connected as a network (i.e. each component is connected to all the others), in parallel, or some combination of serial, parallel and network connections.

As illustrated in FIG. 1, one embodiment of entertainment system 102 includes a set-top-box 100 that is connected to one or more components. Examples of typical entertainment system 102 components include a TV 120, a high definition television (HDTV) set (not shown), a computer 124, and a stereo 128. It should be noted that by stereo 128, this application refers to any type of primarily audio delivery system and includes devices as simple as a speaker or headphones connected to the set-top-box 100 and devices as complex as digital surround sound home theater systems and whole-house audio systems.

The set-top-box 100 of the preferred embodiment may also be connected to several peripheral components. Examples of peripheral components include, but are not limited to, devices such as a telephone (not shown), content capture devices such as a video camera 132 or microphone (not shown), external data storage and playback devices 134, a VCR 136, a DVD player 138, and multipurpose components for a local area network (LAN) 140 that may permit interconnection between components.

Another peripheral commonly included in a entertainment system 102 is a universal remote control 126. Most peripherals are typically, but not necessarily, physically connected to the set-top-box 100 or other components by wire. Remote controls, on the other hand, are typically connected to the set-top-box 100 by radio frequency (RF), infrared (IR) or some other non-physical connection 140. Remote controls 126 may also use a non-physical connection to separately control devices other than set-top-box 100. For example, a non-physical connection may control TV 120. One skilled in the art will recognize that control of numerous other components by non-physical connection are possible. Remote controls 126 are well known in the art and typically comprise the following:

One or more transmitters such as an IR or UHF transmitter adapted to communicate with or issue commands to components. For example, the EchoStar Technologies Corporation 1.5 Remote, model 123479171-AA has a pair of transmitters, an IR transmitter and an ultra high frequency (UHF) transmitter, that are used to connect and send commands to a set-top-box 100;

A means for users to input commands, typically a keypad with a plurality of keys but also including speech recognition;

A power source of some kind, typically a battery; and

Control logic adapted to perform functions including detecting and differentiating user instructions, processing the user instructions and issuing commands substantially in response to the user instructions.

Such control logic also includes means for issuing commands to different components and may include look-up tables of commands required for different manufacturers or a means for a user or third party to program the remote control 126 to control multiple components. The processing function of the remote control may include the use of stored look-up tables or predetermined algorithms or any combination of the two. Any combination of hardware, software and firmware may be used to implement the functions of the remote control and many different logic means adapted for remote controls are well-known in the art.

Furthermore, in accordance with this invention, some of the elements described above may not be located within the remote control itself. For example, one embodiment of the present invention includes a restricted remote control that serves only to relay user selected instructions to a component in the entertainment system. In this embodiment, the control logic, additional communication transmitters or other logic reside within or attached to the component. For the purposes of this disclosure, a remote control is considered to embrace the spectrum comprising restricted remote control devices at one end and a complete stand alone remote control where all elements are located within the remote control at the other end.

One embodiment of the present invention is directed at a remote control apparatus and method for limiting the user's ability to reconfigure the entertainment system to an inoperable configuration. An example of this embodiment is a programmable remote control that can operate in limited mode. When in the limited mode, the user cannot access all of the commands that can normally be issued by the remote control to the components of the entertainment system.

Figure 2:
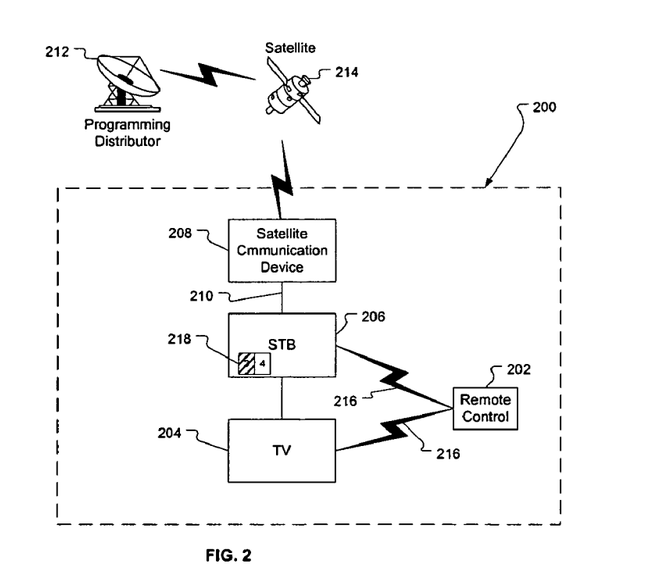
FIG. 2 illustrates a simple entertainment system utilizing an embodiment of the present invention.

FIG. 2 illustrates a simple entertainment system 200 utilizing an embodiment of the present invention. In this embodiment, a simple entertainment system 200 consists of a remote control 202, TV 204, a satellite communication device 208 and a satellite set-top-box 206. The set-top-box 206 of this embodiment receives a signal 210, the signal 210 including multiple channels of television programming from a programming provider 212, via a satellite 214 and a satellite communication device 208. The set-top-box 206 can select a channel from the signal 210 and deliver it to the connected TV 204. Both the set-top-box 206 and the TV 204 may be controlled by the remote control 202 via wireless connections 216. In the embodiment, the set-top-box 206 includes a physical switch 218 to control delivery of RF-modulated programming to an RF carrier channel or video input. RF carrier channels 3 or 4 are typically used to receive RF-modulated programming. In this embodiment, physical switch 218 is located on the body of the STB 206 and is not changeable via remote control commands. One skilled in the art will recognize that other ways of switching delivery channels for RF-modulated programming are possible. In order to display programming delivered by the STB 206, the TV 204 must be tuned to the same channel (or video input) that corresponds to the RF carrier channel indicated by the physical switch 218 of STB 206. In the embodiment shown in FIG. 2, the STB 206 is set to deliver programming on channel 3, as indicated by the diagonal-shading of physical switch 218, and the TV 204 is tuned to channel 3. An embodiment of the present invention is a remote control 202 that can be operated in a limited mode (wherein certain commands that would render the entertainment system 200 inoperable are not accessible by the user) or in a normal mode (wherein there may be no such limitations on user access to commands). The commands rendered inaccessible while in limited mode may be predetermined by the remote control manufacturer, or may be subsequently determined and programmed into the remote control 202 by the user or a third party.

In the embodiment shown, while in limited mode the user cannot send a command to the TV 204 to change channel via the remote control 202. Even if the user attempts to issue the instructions that in normal mode would result in the issuance of a channel change command to the TV 204, the TV command would not be sent. Thus, while in limited mode, preventing the user from inadvertently changing the channel on the TV 204 avoids an inoperable configuration of the entertainment system 200.

Volume control is another operational state that may be protected by the limited mode. In embodiments wherein both the TV 204 and the STB 206 provide volume control, the remote control 202 may also limit the user's control of the TV's or the STB's volume. In the embodiment shown, while in limited mode, the user cannot access or change the STB's volume with the remote control 202.

In an embodiment, the user may select whether to operate the remote control in the limited mode or in normal mode. The user may make this selection during the initial setup or during subsequent programming of the remote control 202. Upon entering the manufacturer's code of a component into the remote control 202, the user has the option of entering an additional character after the manufacturer's code. If the additional character is entered, then, for that component, the remote control will operate in limited mode and not give the user remote access to all of those component's commands. Thus, the remote control in this embodiment may be programmed as limited mode for some components and as normal mode for other components. One skilled in the art will recognize that programming the remote control in limited mode for all components is also possible. In the embodiment, the user must reprogram the remote control 202 in order for the user to change this mode selection.

In another embodiment, the user can make the limited mode selection via a protected switch, such as a switch hidden in the battery compartment or otherwise within the body of the remote control. This protected switch prevents the user from inadvertently changing modes. For example, on the protected switch may be omitted from the keypad where the user can change the mode with a single action. For example, placing the switch in the battery compartment requires that the user open the battery compartment and possibly remove the batteries to access the switch. The switch may also be protected from an inadvertent mode change where the switch is provided as a small toggle switch requiring a ballpoint pen or paper clip to move. This small toggle switch may be provided for each component controllable by the remote control. The embodiments illustrate the fact that it should be difficult, if not impossible, to inadvertently change the operating mode of the remote control 202. One skilled in the art will recognize that there are many other ways to than those described above to prevent users from inadvertently changing modes, any of which ways are equally within the scope of this invention.

Figure 3:
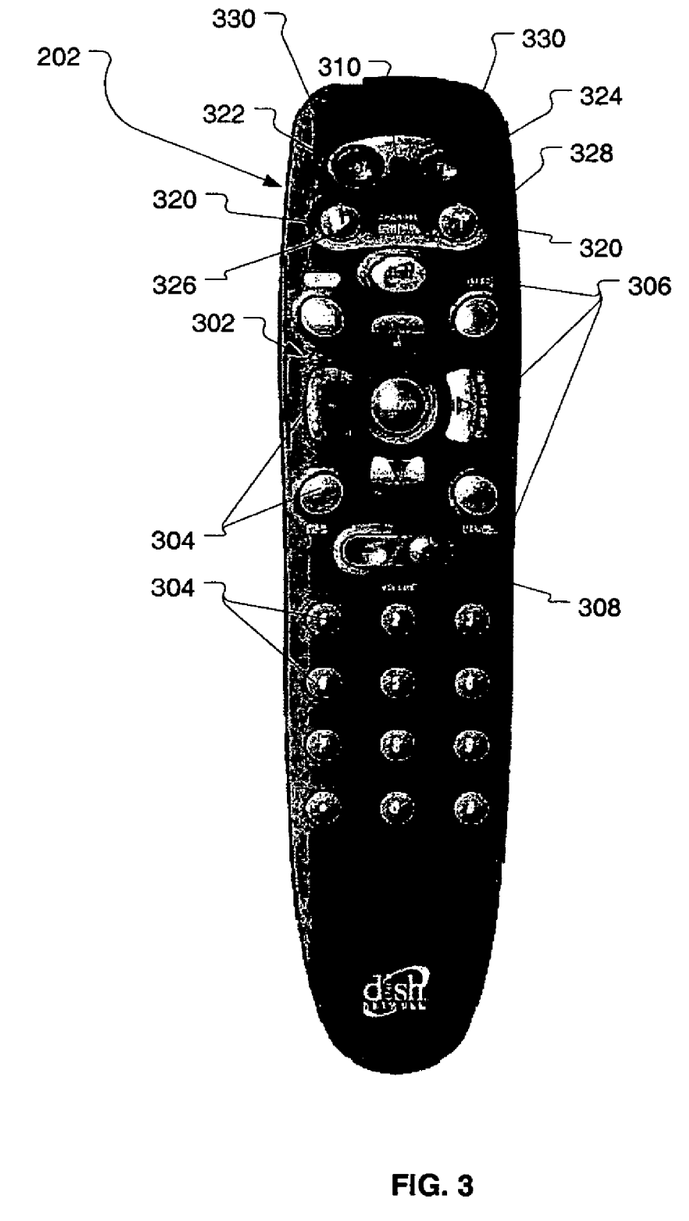
FIG. 3 shows an embodiment of a remote control in accordance with the present invention.

FIG. 3 shows one embodiment of a remote control 202 in accordance with the present invention. The remote control 202 comprises a keypad 302 consisting of a plurality of instruction keys 304 with corresponding labels 306 that may be on or next to their associated keys 304, a plastic body 308 and a light emitting diode (LED) 310. In this embodiment, the remote control also comprises IR and UHF transmitters (not shown), a battery and battery receptacle (not shown) and internal control logic (not shown). One skilled in the art will recognize that other man-machine configurations or interfaces of the remote control 202 are possible and within the scope of this disclosure. One skilled in the art will also recognize that other man-machine remote control interfaces include touch-sensitive display screens, graphical display screens, and voice command circuitry. The user gives instructions to the remote control 202 by depressing the keys 304 on the keypad 302. The control logic, powered by the battery, is adapted to sense the depression of the keys 304 and is capable of issuing commands to a TV 204 and/or the set-top-box 206 in response to the particular keys depressed.

In this embodiment, the remote control 202 includes two power toggle keys 330, a satellite power key labeled 'SAT' 322 and a TV power key labeled 'TV' 324. The remote control also includes two component selection keys 320: a satellite control key 326 labeled with the satellite dish icon, and a TV control key 328 labeled with a TV antenna icon. One skilled in the art will recognize that including fewer or more keys on the remote control is possible. Similar to a typical universal remote, if a user wants to issue a command to the set-top-box 206, he first must depress the 'SAT' key 322, and then depress the instruction key 304 that corresponds to the desired command.

The remote control may communicate changes in mode to the user via the LEDs on the remote control by flashing the LEDs in specified sequences. In an alternative embodiment (not shown) the remote control may be provided with a liquid crystal display (LCD) to display information to the user. For example, a remote control may use a liquid crystal display to identify whether the remote control is programmed for limited mode operation. In yet another embodiment, the LCD may be provided with a touch sensitive screen that may possibly replace some or all off the keys 304.

Figure 4:
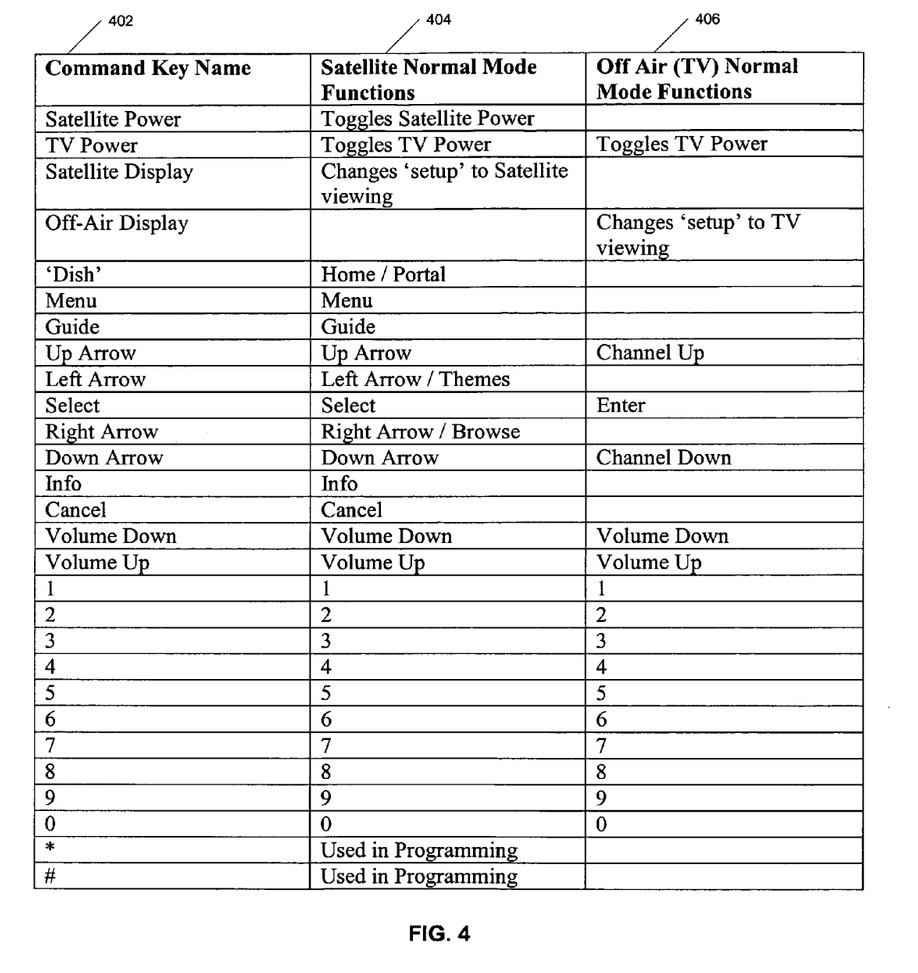
FIG. 4 is a table of keys on the remote control shown in FIG. 3 and the corresponding commands that would be issued if the keys were pressed in normal mode.

FIG. 4 presents a table, corresponding to one embodiment of the present invention, which contains three columns 402, 404 and 406. Column 402 lists the command key names corresponding to the commands that are issued if the keys 304 are pressed with the remote control in normal mode. Columns 404 and 406 list the respective functions or commands that are available depending on which component selection key 320 was last pressed. For example, if the 'SAT' key 322 was the last component selection key pressed, pressing an instruction key 304 listed in the 'Command Key Name' column 402 issues the corresponding set-top-box command listed in the 'Satellite Normal Mode Functions' column 404 to the set-top-box 206. Alternatively, if the 'TV' key 324 was the last component selection key pressed, pressing an instruction key 304 listed in the 'Command Key Name' column 402 issues the corresponding TV command listed in the 'Off-Air (TV) Normal Mode Functions' column 406 being issued to the TV 204. If no command results from pressing an instruction key 304 for a particular selected component, the entry in the list is blank. For example, if the last component selection key 320 pressed was the 'TV' key 324 and the user presses sequentially the instruction keys labeled 4 and 2, the remote control 202 would issue the commands that would change the TV's channel to channel 42. In this example, the remote control 202 is prohibited from issuing commands to the STB. As another example, if the last component selection key 320 pressed was the 'SAT' key 322 and the user presses the instruction key "up arrow", the remote would issue the command to the set-top-box 206 to change the channel delivered by the set-top-box 206 (on the RF carrier channel) up one number. In this example, the remote control 202 is prohibited from issuing commands to the TV. As a third example, if the TV 120 is selected and the user presses the info key, no command is issued by the remote control 142 to the TV 120.

Figure 5:
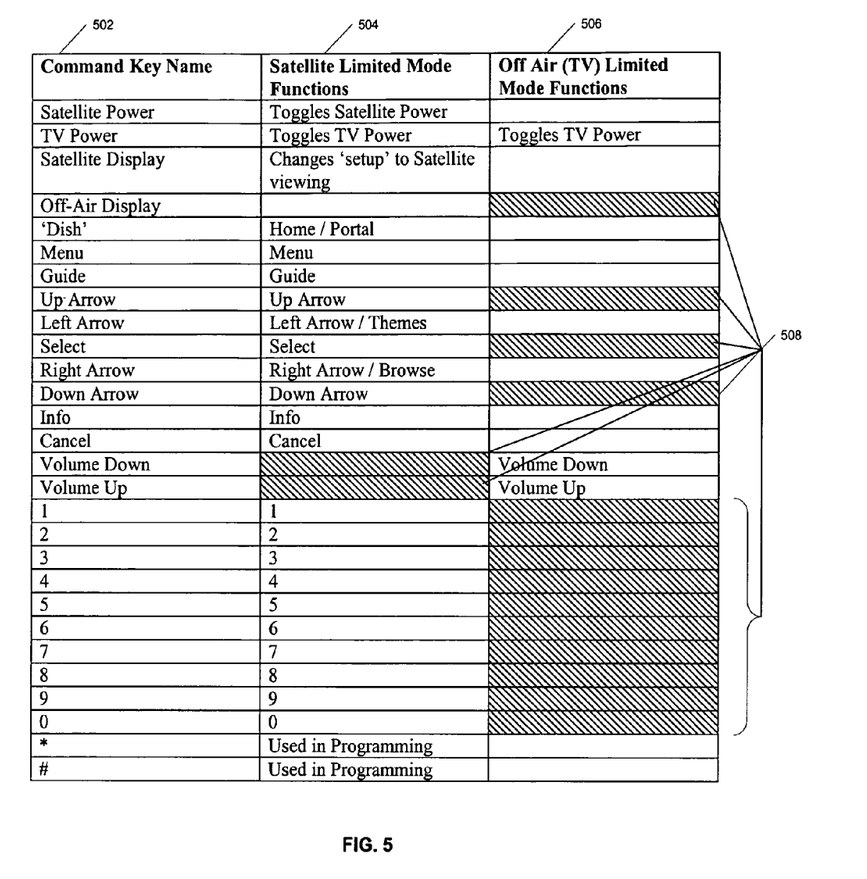
FIG. 5 gives the same table as presented in FIG. 4, except that it shows the corresponding commands available in limited mode in accordance with an embodiment of the present invention.

FIG. 5 presents a similar table as presented in FIG. 4, except that FIG. 5 shows the corresponding commands available in limited mode instead of commands available in normal mode. Limited mode commands, represented in column 502 and corresponding to columns 504 and 506, depend on which component selection key 320 was last pressed. The differences between the tables in FIG. 4 and FIG. 5 are illustrated by cells filled with diagonal lines in FIG. 5. Cells 508 filled with diagonal lines represent functions no longer accessible by the user when the remote control is in limited mode and are referred to as 'limited mode inactive commands' or 'inactive commands' for short. As FIG. 5 shows, there are several instances when TV 204 is selected in limited mode where the pressing of instruction keys 304 issues no command. For an example of operation in limited mode, if the last component selection key 320 pressed was the 'TV' key 324 and the user presses the instruction keys 304 labeled 4 and 2, the remote control 202 only issues commands to the TV 204 (set-top-box 206 commands are inactive). As another example, if the last component selection key 320 pressed was the 'SAT' key 324 and the user presses the "up arrow" instruction key 304, the remote issues the command to the satellite set-top-box 206 to change the channel delivered by the settop-box 206 up one number. As a third example, if the TV 204 is selected and the user presses the info key, no command is issued by the remote control 202 to the TV 204.

The inactive commands listed in FIG. 5 were selected because of their potential for placing the entertainment system 200 into an inoperable configuration. An example of an inoperable configuration (as discussed previously) occurs where the remote control 202 is in normal mode, the TV 204 is tuned to channel 42 and the set-top-box 206 delivers programming on RF carrier channel 3. If the remote control 202 were in normal mode, the TV 204 would tune to channel 42 and, since the STB 206 delivers all programming on the RF carrier channel 3, the TV 204 would not display the programming delivered by the STB. Conversely, if the remote control 202 is in limited mode, the remote control would issue no commands to the TV 204, the TV 204 would not change channel and any programming being delivered by the set-top-box 206 would still be displayed on the TV 204. The entertainment system 200 would remain in an operable configuration as a result of the inactive commands in the limited mode.

The simple entertainment systems discussed above illuminate the embodiments of the remote control apparatus as comprising a normal mode of operation and a limited mode of operation. However, the complexity of the logic in the remote control and the number of commands that should be deactivated may also increase as the number and variety of entertainment system components increases. One skilled in the art will recognize that the present invention contemplates a remote control that may contain logic for multiple entertainment system components.

Another exemplary embodiment of the present invention is a remote control with normal and limited modes of operation for use with an entertainment system comprising a STB, VCR and TV. In this example, the STB delivers programming on channel 3 to a VCR, and the VCR is connected to deliver programming, again modulated onto channel 3, to a TV. The remote control has a set of keys similar to those shown in FIG. 3 and also has additional keys for controlling VCR functions including, but not limited to, a VCR/TV toggle, play, fast forward, rewind, record and pause. In this embodiment, a limited mode exists to limit control of the VCR and the TV by preventing remote control 202 commands that would render the entertainment system inoperable. This embodiment, for example, may prevent the VCR being tuned to a different channel than the RF carrier channel the set-top-box uses to deliver programming. In addition, a 'TV/VCR' button, may also be rendered inactive because this button is only useful if there are multiple analog signals of programming on different frequencies being delivered to the VCR (e.g. from an antenna for broadcasted programming). Likewise, while in limited mode, the user may not be able to change the channel monitored by the TV. A similar limited mode could be provided for each component, including for example a DVD player.

Figure 8:
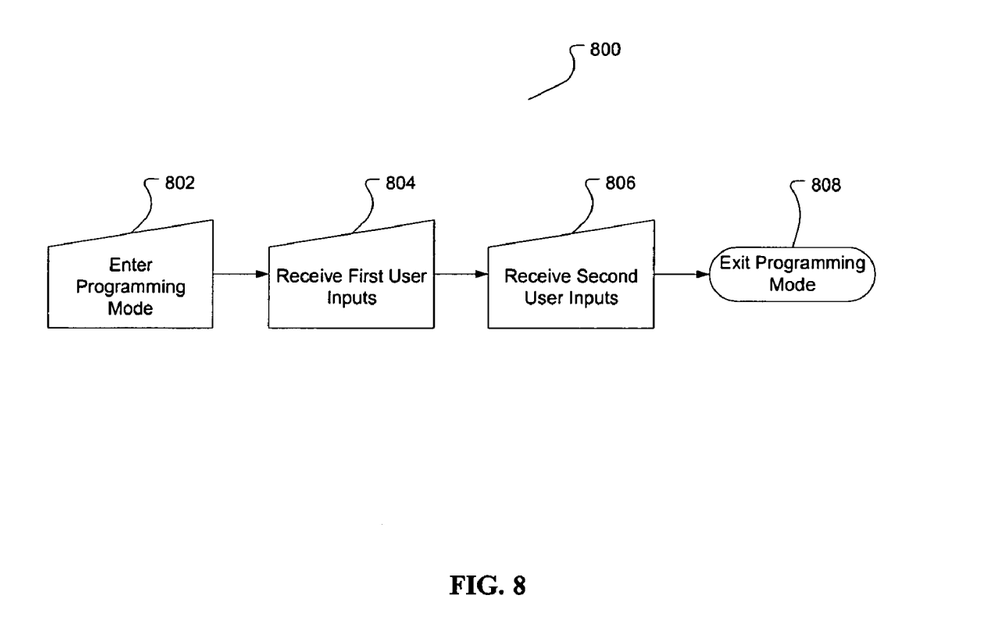
FIG. 8 presents a method for programming a remote control to control a device in an entertainment system in accordance with another embodiment of the present invention.

In accordance with another embodiment of the present invention, FIG. 8 presents a method 800 for programming a remote control to control a device in a limited mode. The remote control of this embodiment is capable of transmitting a set of programmed commands to the device or devices, including commands that change the input monitored by the device or the output the device uses to deliver data. For example, a display device such as a TV may monitor one of a number of inputs (channel 3, channel 4, video input 1, etc.). Alternatively, a set-top-box device may both monitor a number of inputs and deliver programming via a number of outputs (channel 3, channel 4, S-video, etc.). For purposes of this embodiment, a device is considered to be in a different operational state when monitoring different inputs or delivering programming on different outputs.

The method 800 starts by entering a programming mode in an enter programming mode operation 802. The user may have to give a specific user input to enter the programming mode 802. For example, enter programming mode 802 may require pressing and holding a specific key for a period of time.

By entering programming mode 802 a first receiving operation 804 may then receive inputs from the user. User inputs may include the original input used to enter programming mode 802, pressing one or more keys or otherwise selecting a control code for the device to be controlled. User inputs provide the information necessary for the remote control to control the device.

A second receiving operation 806 then receives a user input selecting whether to activate the remote control in a limited mode of control. As discussed above, this input may be appending an additional character, such as "1", to the control code of the device received in the first receiving operation 804. One skilled in the art will recognize that many other user input alternatives are possible.

Upon exit of the programming mode 808 and selection of the limited mode, the remote control will be in a limited mode for the device and prevent the remote control from transmitting a predetermined subset of the set of commands that may normally be transmitted to the device. The predetermined subset of commands may include only commands to the device that would not render inoperable an entertainment system including the device. Such commands may include only commands to the device that do not change the input monitored by the device or the output of the device.

Method 800 may also include storing a set of commands for the device on the remote control and determining the subset of the set of commands based on the possible effect of each command on the input or output used by the device. The subset of the set of commands may be provided in a table or by using a flag for each command indicating its status in normal mode and limited mode.

Another aspect of the present invention is directed at a remote control apparatus and method for assisting the user's ability to operate the entertainment system 102 by issuing multiple commands to one or more components in response to a single user instruction. For simplicity, in this application a single user instruction that issues multiple commands is referred to as a 'macro instruction.' A further means of assisting the reader's understanding, embodiments of this aspect of the present invention will first be discussed in relation to a simple entertainment system. After the specific example, a general embodiment will then be presented.

Figure 6:
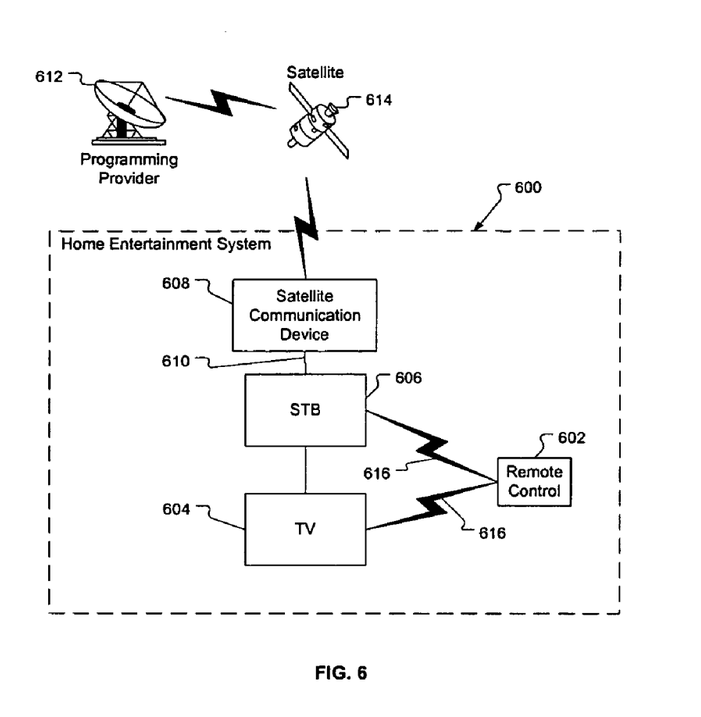
FIG. 6 presents a simple entertainment system utilizing an embodiment of the present invention.

FIG. 6 presents a simple entertainment system 600 utilizing an embodiment of the present invention. The simple entertainment system 600 consists of a remote control 602, TV 604, a satellite antenna 608 and a STB 606. The STB 606 receives an input signal 610 including multiple channels of television programming from a programming provider 612 via a satellite 614 and a satellite communication device 608. The STB 606 can select a channel from the signal 610 and deliver it to the connected TV 604. Both the STB 606 and the TV 604 may be controlled by the remote control 602 via wireless connections 616. In the embodiment, the STB 606 is set to deliver programming to the TV 604 via a physical switch (not shown) on the body of the STB 606. The physical switch is not changeable via remote control commands. In order to display programming delivered by the STB 606, the TV 604 must be tuned to the channel (or video input) that the STB 606 is set to deliver programming on. In the embodiment shown in FIG. 6, the STB 606 is set to deliver programming on channel 3 and the TV 604 is tuned to channel 3.

Typically, a user with a universal remote control would have to enter at lest three separate instructions by pressing three separate keys on the remote control to turn on the entertainment system and display desired content: one key to turn on the TV 604; one key to turn on the STB 606; and at least one key to tune the STB 606 to the desired channel of television programming. In addition, if the TV 604 was not tuned to display the channel that the set-top-box 606 delivered programming on (i.e. channel 3 in the embodiment), the user would also have to retune the TV 604. Similarly, for a user to turn off the entertainment system 600, the user would have to press at least three keys: one to turn off the currently selected component; one to select the second component; and one to turn off that component.

One embodiment of the present invention is a remote control that simultaneously issues commands to multiple components in response to a single user input, such as a macro instruction key to turn on the entertainment system 600. In this embodiment, the remote control may transmit a 'turn on' command to each component for which the remote control has been programmed.

Another embodiment of the present invention is a remote control that powers on both the TV 604 and the STB 606, and issues the command to tune the TV 604 to channel 3 in response to a single user macro instruction to turn on the entertainment system 600. In this embodiment, once the user has set up an operable configuration for the entertainment system 600, the user may be prompted to store the configuration in the remote control. In this embodiment and the previous embodiment, the STB 606 is set to deliver programming on channel 3 and the TV 604 is tuned to channel 3. Upon receipt of a turn on command, the remote sends commands causing the TV 604 and STB 606 to change to this configuration if they are not already in those states.

In another embodiment, the remote control may also include a configuration macro instruction key on the remote control that sends the currently stored configuration, rather than sending the commands with every macro instruction turn on command.

Another embodiment is a remote control that turns off both the TV 604 and the STB 606 in response to a single turn off macro instruction from the user.

In yet another embodiment, both components, if currently off, are turned on when the remote control detects any instruction by the user. For example, the remote control 602, upon receiving a 'go to preferred channel A' instruction, would turn on all necessary components in the entertainment system 600 and issue whatever commands were necessary to display the preferred programming (such as tuning the TV to channel 3 if tuned to some other channel). One skilled in the will recognize that, depending on the number and type of components connected to the entertainment system 600, other macro instructions are possible. One such example is set forth in the next embodiment.

Figure 7:
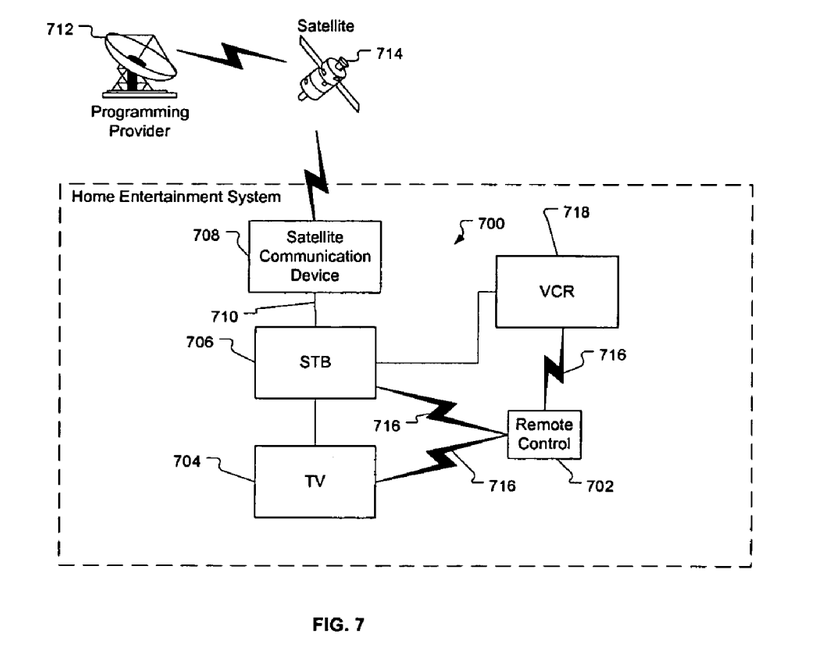
FIG. 7 illustrates a second entertainment system utilizing a remote control in accordance with another embodiment of the present invention.

FIG. 7 illustrates another, slightly more complicated, entertainment system 700 utilizing another embodiment of a remote control 702 in accordance with the present invention. The entertainment system 700 consists of a remote control 702, TV 704, a satellite communication device 708 and a STB 706. The STB 706 receives a signal 710 of multiple channels of television programming from a programming provider 712 via a satellite 714 and a satellite communication device 708. The STB 706 can select a channel from the signal 710 and deliver it to the connected TV 704. Both the STB 706 and the TV 704 may be controlled by the remote control 702 via wireless connections 716. In this embodiment, the STB 706 is set to deliver programming via a physical switch (not shown) on the body of the STB 706 and is not changeable via remote control commands. In order to display programming delivered by the STB 706, the TV 704 must be tuned to the channel (or video input) that the STB 706 is set to deliver programming on. In the embodiment shown in FIG. 7, the STB 706 is set to deliver programming on channel 3 and the TV 704 is tuned to channel 3. The entertainment system in FIG. 7 differs from that in FIG. 6 in that it includes a VCR 718 connected to the STB 706 via a peripheral input such that the STB 706 and the TV 704 must be on to display programming delivered by the VCR 718. One skilled in the art will recognize that other ways of connecting the VCR are possible. For example, another way of connecting the VCR includes, but is not limited to, passing the stream of channels 710 to the VCR then to the STB or connecting the VCR solely to the TV.

In the embodiment, the remote control 702, the 'play' VCR instruction is a macro instruction that issues commands that powers on the VCR 718, the STB 706, and the TV 704, also issues the command to the VCR 718 to play the tape in the VCR and changes the STB's 706 input setting and the TV's 704 channel to those necessary to display programming delivered by the VCR 718.

In another embodiment, the remote control 702 has an 'entertainment system turn off' macro instruction that issues commands that turn off the VCR 718, TV 704 and STB 706 upon receipt of a single user macro instruction to turn off the entertainment system 700.

As another example, in an entertainment system that includes a home theater sound system, an embodiment of the present invention includes turning on the home theater and other components of the entertainment system in response to a single user macro instruction. A further embodiment, also for a entertainment system that includes a home theater sound system, includes the remote control turning on multiple components of the entertainment system including the home theater sound system and also issuing a command to set the volume of the home theater sound system to a predetermined level.

As the exemplary embodiments of the present invention described above illustrate, as the number of components of the entertainment system increase, the number and nature of specific commands issued as a result of a macro instruction by a remote control apparatus designed in accordance with the present invention will increase.

Stated in general terms, one embodiment of the present invention is a remote control apparatus that, in response to a single user instruction, issues a plurality of commands to change operational states to one or more components in an entertainment system. Another general embodiment is a remote control apparatus that issue one or more commands to a plurality of components in an entertainment system in response to a single user instruction.

It will be clear that the present invention is well adapted to attain the ends and advantages mentioned as well as those inherent therein. While presently preferred embodiments have been described for purposes of this disclosure, various changes and modifications may be made which are well within the scope of the present invention. For example, embodiments described above may be implemented in any component of the entertainment system, in addition to a remote control, if the component has a transmitter and is capable of issuing commands to the other components. Specifically, if a STB is provided with an IR transmitter powerful enough to issue commands, for example, to any components in the room (via reflection), then the configuration information and configuration macro instruction key could be provided on the STB. Numerous other changes may be made which will readily suggest themselves to those skilled in the art and which are encompassed in the spirit of the invention disclosed and as defined in the appended claims.

We claim:

1. A remote control, for use with an entertainment system having a TV and set-top-box, the remote control comprising:
   a transmitter capable of transmitting commands to the TV and to the set-top-box;
   a keypad comprising a plurality of user-selectable keys;
   a memory storing commands for the set-top-box and the TV; and
   control logic adapted to issue commands, via the transmitter and in response to the keys selected to the set-top-box and TV;
   wherein the remote control is configured to allow a user to select one of at least two modes of operation for the remote control, and to allow the user to set the remote control to control one of the set-top box and the TV, wherein the modes of operation comprise a normal mode and a limited mode;
   wherein, when in normal mode or limited mode and set to control the set-top box, the remote control allows, the user to issue a first set of commands to the set-top-box;
   wherein, when in normal mode and set to control the TV, the remote control allows the user to issue a second set of commands to the TV; and
   wherein, when in limited mode and set to control the TV, the remote control allows the user to issue a subset of the second set of commands to the TV, and prevents the user from issuing those of the second set of commands not in the subset, the subset selected from the group consisting of a command to turn the TV on, a command to turn the TV off and commands to change the volume of the TV.

2. The remote control of claim 1 wherein the subset consists of the command to the turn the TV on and the command to turn the TV off.

3. The remote control of claim 2 wherein the command to turn the TV on and the command to turn the TV off are the same command.

4. The remote control of claim 1, wherein the user selects the mode via a sequence of keystrokes.

5. The remote control of claim 1 further comprising:
   one or more LEDs; and
   wherein the control logic is adapted, upon receipt of a user selection of a mode, to use the LEDs to give a visual indication to the user of the mode selected.

6. The remote control of claim 1, wherein the remote control is adapted to operate in either a normal or limited mode for any component it can control.

7. The remote control of claim 1, wherein the mode is selected by the user during programming of the remote control based on the characters entered for the control code used to the control code the TV.

8. The remote control of claim 1, wherein:
   the transmitter is capable of transmitting commands to a VCR;
   the memory is capable of storing commands for the VCR;
   the control logic is adapted to issue commands, via the transmitter and in response to the keys selected, to the VCR;
   wherein the remote control is configured to allow the user to set the remote control to control the VCR;
   wherein, when in the normal mode and set to control the VCR, the remote control allows the user to issue a third set of commands to the VCR; and
   wherein, when in the limited mode and set to control the VCR, the remote control allows the user to issue a subset of the third set of commands to the VCR, and prevents the user from issuing those of the third set of commands not in the subset, the subset selected from the group consisting of a command to turn the VCR on, a command to turn the VCR off and commands to play, stop, rewind, pause, record, eject and fast-forward a video cassette.

9. The remote control of claim 1, wherein:
   the transmitter is capable of transmitting commands to a DVD player;
   the memory is capable of storing commands for the DVD player; and
   the control logic is adapted to issue commands, via the transmitter and in response to the keys selected, to the DVD player;
   wherein the remote is configured to allow the user to set the remote control to control the DVD player;
   wherein, when in the normal mode and set to control the DVD player, the remote control allows the user to issue a third set of commands to the DVD player; and
   wherein, when in the limited mode and set to control the DVD player, the remote control allows the user to issue a subset of the third set of commands to the DVD player, and prevents the user from issuing those of the third set of commands not in the subset, the subset selected from the group consisting of a command to turn the DVD player on, a command to turn the DVD player off and commands to play, stop, rewind, pause, and fast-forward a DVD.

10. The remote control of claim 1, wherein selection of the mode requires multiple user actions in a prescribed sequence and further comprising:
    a protected switch for selecting normal mode or limited mode; and
    wherein the multiple user actions include accessing the protected switch.

11. The remote control of claim 10, wherein the protected switch is within a battery compartment of the remote control.

12. A remote control, for use with an entertainment system comprising a plurality of components where at least two of the plurality of components have a plurality of operational states, the remote control comprising:
    a transmitter for communicating with at least one of the plurality of components;
    control logic for transmitting signals via the transmitter; and
    wherein the control logic is adapted to allow the user to select between a first mode and a second mode of remote control operation, and to allow the user to select one of the plurality of components to control;
    wherein, when the remote control is in the first mode of remote control operation and the user has selected a first of the components to control, the user can give any of a first set of instructions to the remote control resulting in the remote control transmitting one or more of a first set of commands for the first of the components corresponding to the first set of instructions;
    wherein, when the remote control is in the second mode of remote control operation and the user has selected the first of the components to control, the user can give any of the first set of instructions to the remote control but the remote control will transmit only commands to the first of the components that correspond to a predetermined subset of the first set of instructions; and wherein the selection of the first mode or the second mode is not based on an identity of the user.

13. The remote control of claim 12 wherein the predetermined subset of the first set of instructions are selected to prevent the user from rendering the entertainment system inoperable.

14. The remote control of claim 12 wherein the control logic is adapted to allow the user to select between the first mode and the second mode during programming of the remote control to control a component.

15. The remote control of claim 12, wherein the user selects the first or second mode of operation for a component when programming the remote control to control the component.

16. The remote control of claim 12, wherein the remote control is part of a component in the entertainment system.

17. The remote control of claim 15, wherein the user selects the second mode for a component when entering the component's control code.

18. The remote control of claim 17, wherein the user selects the second mode for all components via a protected switch.

19. A method for transferring user commands to an entertainment system component to maintain the component in an operational state, the method comprising:
- receiving a selection of a first mode of remote control operation or a second mode of remote control operation from a user at a remote control device, wherein the selection is not associated with an identity of the user;
- receiving a selection of one of a plurality of components of an entertainment system from the user;
- receiving instructions for controlling the selected component from the user at the remote control device;
- in the first mode, transmitting a command to the selected component in response to each of the received instructions; and
- in the second mode, transmitting a command to the selected component in response to each of a subset of the received instructions, wherein no commands are transmitted in response to those of the received instructions not belonging to the subset.

20. The method of claim 19, wherein the subset is selected from the group consisting of a command to turn the selected component on, a command to turn the selected component off, and commands to change an audio volume of the selected component.

21. The method of claim 19, further comprising:
- receiving a selection of a second one of the plurality of components of the entertainment system;
- receiving second instructions for controlling the second selected component from the user at the remote control device;
- in the first mode, transmitting a command to the second selected component in response to each of the received second instructions; and
- in the second mode, transmitting a command to the second selected component in response to each of a subset of the received second instructions, wherein no commands are transmitted in response to those of the received second instructions not belonging to the subset of the received second instructions.

22. The method of claim 20, wherein the selected component comprises a television.

23. The method of claim 21, wherein the subset of the received second instructions comprises a command to turn the second selected component on, a command to turn the second selected component off, and commands to change a programming channel of the second selected component.

24. The method of claim 23, wherein the second selected component comprises a television converter device.

* * * * *